(12) United States Patent
Trabold et al.

(10) Patent No.: US 8,053,133 B2
(45) Date of Patent: Nov. 8, 2011

(54) BIPOLAR PLATE HYDROPHILIC TREATMENT FOR STABLE FUEL CELL STACK OPERATION AT LOW POWER

(75) Inventors: Thomas A. Trabold, Pittsford, NY (US); Steven R. Falta, Honeoye Falls, NY (US); Pinkhas A. Rapaport, Fairport, NY (US); Reena L. Datta, Rochester, NY (US); Gayatri Vyas Dadheech, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 995 days.

(21) Appl. No.: 11/936,651

(22) Filed: Nov. 7, 2007

(65) Prior Publication Data

US 2009/0117443 A1    May 7, 2009

(51) Int. Cl.
*H01M 2/38* (2006.01)
*H01M 6/24* (2006.01)
*B05D 5/12* (2006.01)
*C03C 15/00* (2006.01)

(52) U.S. Cl. ........... 429/457; 429/452; 427/115; 216/83
(58) Field of Classification Search .................. 429/452, 429/457; 427/115
See application file for complete search history.

(56) References Cited

U.S. PATENT DOCUMENTS

| 2006/0194095 | A1 | 8/2006 | Vyas et al. | |
|---|---|---|---|---|
| 2006/0216570 | A1 | 9/2006 | Vyas et al. | |
| 2006/0216571 | A1* | 9/2006 | Vyas et al. | 429/38 |
| 2006/0257711 | A1* | 11/2006 | Elhamid et al. | 429/38 |
| 2007/0134541 | A1* | 6/2007 | Arisaka et al. | 429/38 |
| 2008/0076004 | A1* | 3/2008 | Rodak et al. | 429/38 |

FOREIGN PATENT DOCUMENTS

CN    101044649 A    9/2007

* cited by examiner

*Primary Examiner* — Karie O'Neill Apicella
(74) *Attorney, Agent, or Firm* — John A. Miller; Miller IP Group, PLC

(57) ABSTRACT

A flow field plate or bipolar plate for a fuel cell that includes a hydrophilic coating formed on flow field channels extending through a tunnel region between a cell active area and the inlet and outlet manifolds. The flow field plates are an assembly of a cathode side unipolar plate and an anode side unipolar plate. The hydrophilic coating is deposited on the unipolar plates prior to the unipolar plates being assembled into the flow field plate so that line of site deposition processes can be used to coat the flow field channels in the tunnel region. The unipolar plates can be any suitable fuel cell unipolar plates, such as stamped unipolar plates or composite unipolar plates.

22 Claims, 3 Drawing Sheets

BIPOLAR PLATE HYDROPHILIC TREATMENT FOR STABLE FUEL CELL STACK OPERATION AT LOW POWER

BACKGROUND OF THE INVENTION

1. Field of the Invention

This invention relates generally to bipolar plates for fuel cells and, more particularly, to a bipolar plate for a fuel cell, where the bipolar plate includes a hydrophilic coating that extends completely through the tunnel region of the flow channels between the fuel cell flow field active region and the inlet and outlet manifolds.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The bipolar plates are typically made of a conductive material, such as stainless steel, titanium, aluminum, polymeric carbon composites, etc., so that they conduct the electricity generated by the fuel cells from one cell to the next cell and out of the stack. Metal bipolar plates typically produce a natural oxide on their outer surface that makes them resistant to corrosion. However, the oxide layer is not conductive, and thus increases the internal resistance of the fuel cell, reducing its electrical performance. Also, the oxide layer makes the plate more hydrophobic. It is known in the art to deposit a thin layer of a conductive material, such as gold, on the bipolar plates to reduce the contact resistance between the plate and diffusion media in the fuel cells.

As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below 0.2 A/cm$^2$, the water may accumulate within the flow channels because the flow rate of the reactant gas is too low to force the water out of the channels. As the water accumulates, it forms droplets that continue to expand because of the relatively hydrophobic nature of the plate material. The droplets form in the flow channels substantially perpendicular to the flow of the reactant gas. As the size of the droplets increases, the flow channel is closed off, and the reactant gas is diverted to other flow channels because the channels are in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

It is usually possible to purge the accumulated water in the flow channels by periodically forcing the reactant gas through the flow channels at a higher flow rate. However, on the cathode side, this increases the parasitic power applied to the air compressor, thereby reducing overall system efficiency. Moreover, there are many reasons not to use the hydrogen fuel as a purge gas, including reduced economy, reduced system efficiency and increased system complexity for treating elevated concentrations of hydrogen in the exhaust gas stream.

Reducing accumulated water in the channels can also be accomplished by reducing inlet humidification. However, it is desirable to provide some relative humidity in the anode and cathode reactant gases so that the membrane in the fuel cells remains hydrated. A dry inlet gas has a drying effect on the membrane that could increase the cell's ionic resistance, and limit the membrane's long-term durability.

It has been proposed in the art to make bipolar plates for a fuel cell hydrophilic to improve channel water transport. A hydrophilic plate causes water in the channels to form a thin film that has less of a tendency to alter the flow distribution along the array of channels connected to the common inlet and outlet headers. If the plate material is sufficiently wettable, water transport through the diffusion media will contact the channel walls and then, by capillary force, be transported into the bottom corners of the channel along its length. The physical requirements to support spontaneous wetting in the corners of a flow channel are described by the Concus-Finn condition, $$\beta + \frac{\alpha}{2} < 90°,$$

where β is the static contact angle and α is the channel corner angle. For a rectangular channel α/2=45°, which dictates that spontaneous wetting will occur when the static contact angle is less than 45°. For the roughly rectangular channels used in current fuel cell stack designs with composite bipolar plates, this sets an approximate upper limit on the contact angle needed to realize the beneficial effects of hydrophilic plate surfaces on channel water transport and low load stability.

The benefit of hydrophilic coatings on bipolar plates in PEM fuel cell stack operation has been demonstrated through testing using various coatings, such as chromic acid etching and silicon dioxide ($SiO_2$). These tests have shown clear improvements in low power voltage stability as compared to stacks run with untreated bipolar plates. These tests include evaluating low power stability by changing the stack load from either a wet or dry condition at a 0.6 A/cm² to a wet or dry condition at either 0.1 or 0.05 A/cm². If no cell voltage drops below 300 mV for 120 minutes after the change to low load, it is considered that this transition is successfully passed. However, these tests have shown that extremely hydrophilic surfaces within the flow channels of the bipolar plate still have some stability issues at current densities of 0.05 Acm² and lower under wet conditions.

In certain fuel cell stack designs, the reactant gas flow channels for both the anode side and the cathode side of the fuel cell typically transition between the inlet manifold and the active area of the fuel cell and the active area of the fuel cell and the outlet manifold through a cell sealing area. At this sealing area, the flow channels have a jog in which they go under the seal, referred to in the industry as tunnel regions of the flow channels. The known coating processes for providing a hydrophilic layer on the bipolar plates are typically line of sight deposition processes, such as PVD, where the flow channels in the tunnel regions typically do not get coated with the hydrophilic material.

SUMMARY OF THE INVENTION

In accordance with the teachings of the present invention, a flow field plate or bipolar plate for a fuel cell is disclosed that includes a hydrophilic coating formed on flow field channels extending through a tunnel region between a cell active area and the inlet and outlet manifolds. The flow field plates are an assembly of a cathode side unipolar plate and an anode side unipolar plate. The hydrophilic coating is deposited on the unipolar plates prior to the unipolar plates being assembled into the flow field plate so that line of site deposition processes can be used to coat the flow field channels in the tunnel region. The unipolar plates can be any suitable fuel cell unipolar plates, such as stamped unipolar plates or composite unipolar plates.

Additional features of the present invention will become apparent from the following description and appended claims, taken in conjunction with the accompanying drawings.

DETAILED DESCRIPTION OF THE EMBODIMENTS

Figure 1:
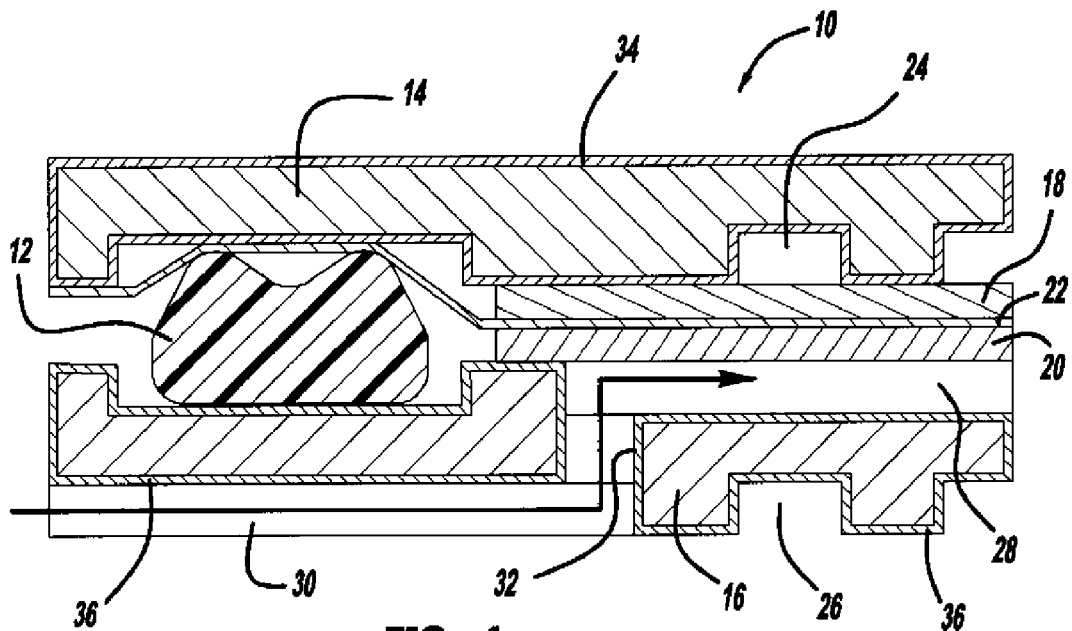
FIG. 1 is a cross-sectional view of a portion of a fuel cell including composite bipolar plates that show a flow channel tunnel region at a seal area between a cathode inlet manifold and a cell active region, where unipolar plates include a hydrophilic layer on each side of the plate, according to an embodiment of the present invention.

The following discussion of the embodiments of the invention directed to a method for coating bipolar plates for a fuel cell with a hydrophilic material in the flow channel tunnel regions is merely exemplary in nature, and is in no way intended to limit the invention or its applications or uses.

As discussed above, a fuel cell stack typically includes a seal that extends around the active area of the stack and between the stack manifolds and the active area for each fuel cell to prevent gas leakage from the stack. In order to get the cathode flow, the anode flow and the cooling fluid flow from the respective inlet manifold into the active area flow channels of the fuel cell and from the active area flow channels to the respective outlet manifold, it is necessary for the flow channels to go through the seal area without affecting seal integrity. Typically holes are provided through the bipolar plate around the seals, which requires a bend in the flow channels so that they line up with the flow channels in the active area. This bend in the cathode and anode flow channels provides an area that water can accumulate and be trapped which had a tendency to close the flow channel and reduce the flow of reactant gas.

It is known in the art to deposit coatings on the bipolar plates that make the plates conductive, corrosion resistant, hydrophilic and/or stable in the fuel cell environment. In one embodiment, the hydrophilic coating is a metal oxide. Suitable metal oxides for the hydrophilic coatings include, but are not limited to, silicon dioxide ($SiO_2$), hafnium dioxide ($HfO_2$), zirconium dioxide ($ZrO_2$), aluminum oxide ($Al_2O_3$), tin oxide ($SnO_2$), tantalum pent-oxide ($Ta_2O_5$), niobium pent-oxide ($Nb_2O_5$), molybdenum dioxide ($MoO_2$), iridium dioxide ($IrO_2$), ruthenium dioxide ($RuO_2$) and mixtures thereof.

The metal oxides can be doped to make them electrically conductive. Suitable dopants can be selected from materials that can create suitable point defects, such as N, C, Li, Ba, Pb, Mo, Ag, Au, Ru, Re, Nd, Y, Mn, V, Cr, Sb, Ni, W, Zr, Hf etc. and mixtures thereof. In one particular embodiment, the doped metal oxide is niobium (Nb) and tantalum (Ta) doped titanium oxide ($TiO_2$) and fluorine (F) doped tin oxide ($SnO_2$). The amount of dopant in the coatings can be in the range of 0-10% of the composition of the coatings.

In another embodiment, the hydrophilic coatings are carbides that are conductive, corrosion resistant, hydrophilic and stable in the fuel cell environment. Suitable carbides include, but are not limited to, chromium carbide, titanium carbide, tantalum carbide, niobium carbide and zirconium carbide.

In another embodiment, hydrophilic coatings can be formed by a chromic acid etch that roughens the surface of the plates to increase their hydrophilicity.

The hydrophilic metal oxide material can be deposited on the bipolar plates by any suitable technique including, but not limited to, physical vapor deposition (PVD) processes, chemical vapor deposition (CVD) processes, thermal spraying processes and sol-gel. Suitable examples of physical vapor deposition processes include electron beam evaporation, magnetron sputtering and pulsed plasma processes. Suitable chemical vapor deposition processes include plasma enhanced CVD and atomic layer deposition processes.

FIG. 1 is a cross-sectional view of a portion of a fuel cell 10 between an anode inlet manifold (not shown) and a cell active area (not shown) separated by a seal 12. The fuel cell 10 includes an anode side composite unipolar plate 14 and a cathode side composite unipolar plate 16. The unipolar plates 14 and 16 are half of the bipolar plate for adjacent cells where the unipolar plate for the adjacent fuel cell is not shown. The unipolar plates for adjacent fuel cells can secured together to form the complete bipolar plate by any suitable process, such as laser welding. The fuel cell 10 also includes an anode side diffusion media layer 18, a cathode side diffusion media layer 20 and a membrane 22 therebetween. The anode side unipolar plate 14 includes anode flow channels 24 and the cathode side unipolar plate 16 includes half of cooling fluid flow channels 26, where the other half of the cooling fluid flow channels is provided by the other unipolar plate. The unipolar plate 16 also includes cathode flow channels 28. As is apparent, the cathode flow channels 28 extend through a tunnel region 30 including a hole 32 so that the flow channel 28 can extend under the seal area defined by the seal 12.

As discussed above, various electrically conductive and hydrophilic materials are deposited on the bipolar plates to provide better reactant gas flow through the flow channels 24 and 28. However, typically the processes used to deposit the hydrophilic materials were line of sight deposition processes performed after the unipolar plates were welded or adhered together in some fashion to form the complete bipolar plate. Therefore, these processes typically prevented the hydrophilic material from extending into the hole 32 and the tunnel region 30 of the cathode flow channels 28. The tunnel region 30 is a location where water tended to accumulate, and without the hydrophilic material in this region, the effect of the water accumulation increased.

According to the invention, the hydrophilic materials are deposited on unipolar plates prior to the unipolar plates being assembled together so that the material is deposited in all areas of the flow channels including the tunnel region 30. The hydrophilic layers are represented as layer 34 on the anode side unipolar plate 14 and layer 36 on the cathode side unipolar plate 16. The hydrophilic layers are deposited on all surfaces of the unipolar plates 14 and 16 so that when the unipolar plates are assembled into the bipolar plates, the layers 34 and 36 will contact each other at the cooling fluid flow channel region.

Figure 2:
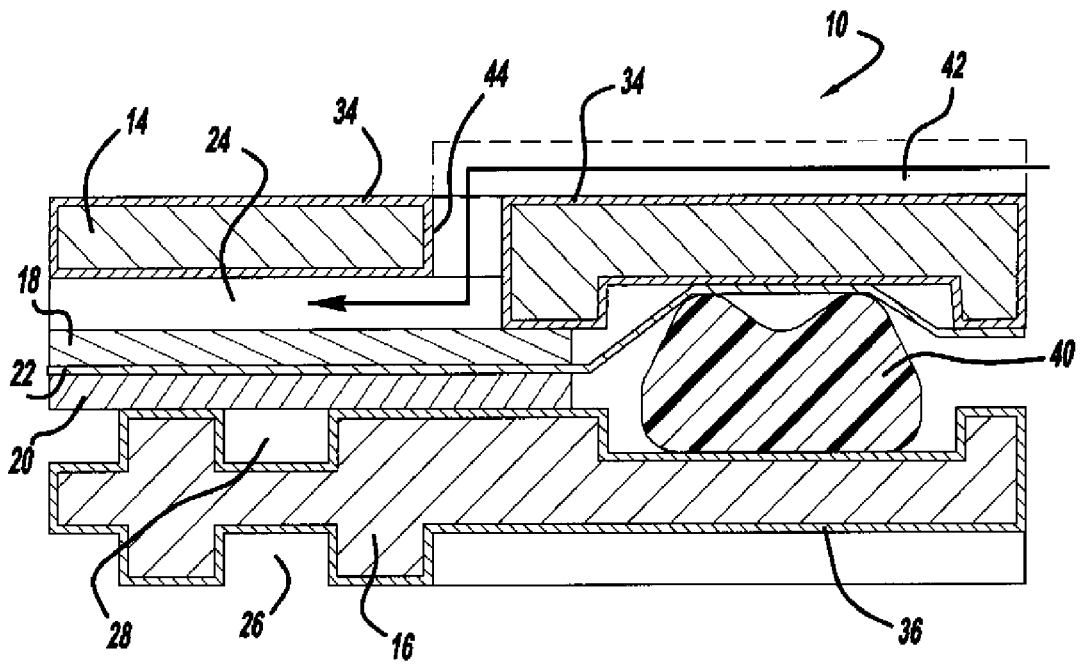
FIG. 2 is a cross-sectional view of a portion of a fuel cell including composite bipolar plates that show a flow channel tunnel region at a seal area between an anode inlet manifold and a cell active region, where unipolar plates include a hydrophilic layer on each side of the plate, according to an embodiment of the present invention.

FIG. 2 is a cross-sectional view of another portion of the fuel cell 10 between an anode inlet manifold (not shown) and the active area of the fuel cell 10. A seal 40 provides the sealing between the anode inlet manifold and the active region. As is apparent, the anode flow channels 24 also jogs around the seal 40, through a hole 44 and into tunnel region 42. As is also apparent, the hydrophilic layer 34 is provided through the tunnel region 42. As would be appreciated by those skilled in the art, the tunnel region between the anode outlet manifold (not shown) and the active region and the cathode outlet manifold and the active region would also be coated with the hydrophilic material.

Figure 3:
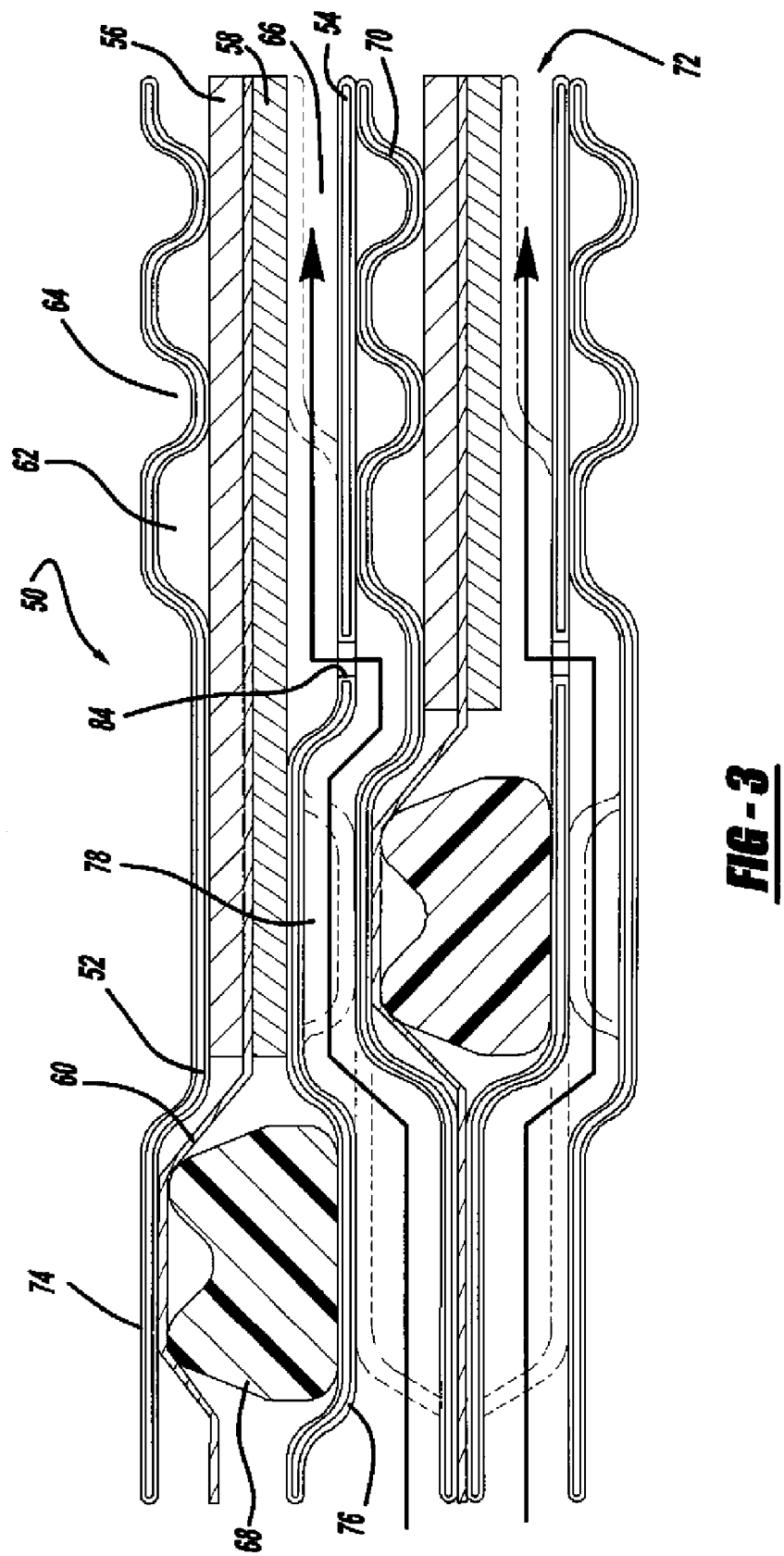
FIG. 3 is a cross-sectional view of a portion of a fuel cell including stamped bipolar plates that show a flow channel tunnel region at a seal area between a cathode inlet manifold and a cell active region, where unipolar plates include a hydrophilic layer on each side of the plate, according to an embodiment of the present invention.

FIG. 3 is a cross-sectional view of a portion of a fuel cell 50 between a cathode inlet manifold (not shown) and an active area (not shown) of the fuel cell 50 separated by a seal 68. The fuel cell 50 includes an anode side stamped metal unipolar plate 52 and a cathode side stamped metal unipolar plate 54. The unipolar plates 52 and 54 are half of the bipolar plates for adjacent fuel cells. An anode side unipolar plate 70 for an adjacent fuel cell 72 combines with the unipolar plate 54 to provide the complete bipolar plate between the fuel cells 50 and 72. The fuel cell 50 includes an anode side diffusion media layer 56, a cathode side diffusion media layer 58 and a membrane 60 therebetween. The anode side unipolar plate 52 includes anode flow channels 62 and cooling fluid flow channels 64. The cathode side unipolar plate 54 includes cathode flow channels 66. As is apparent, the cathode flow channels 66 extend through a hole 84 and a tunnel region 78 in the unipolar plate 54 through which the cathode air flow flows.

According to the invention, the hydrophilic material is deposited on the unipolar plates prior to the unipolar plates being assembled together so that the material is deposited in all areas of the flow channels including the tunnel region 78. These layers are represented as layer 74 on the anode side unipolar plate 52 and layer 76 on the cathode side unipolar plate 54. The layers 74 and 76 are deposited on all surfaces of the unipolar plates 52 and 54 so that when the unipolar plates are assembled into the bipolar plates, the hydrophilic layers will contact each other at the cooling fluid flow channel region.

Figure 4:
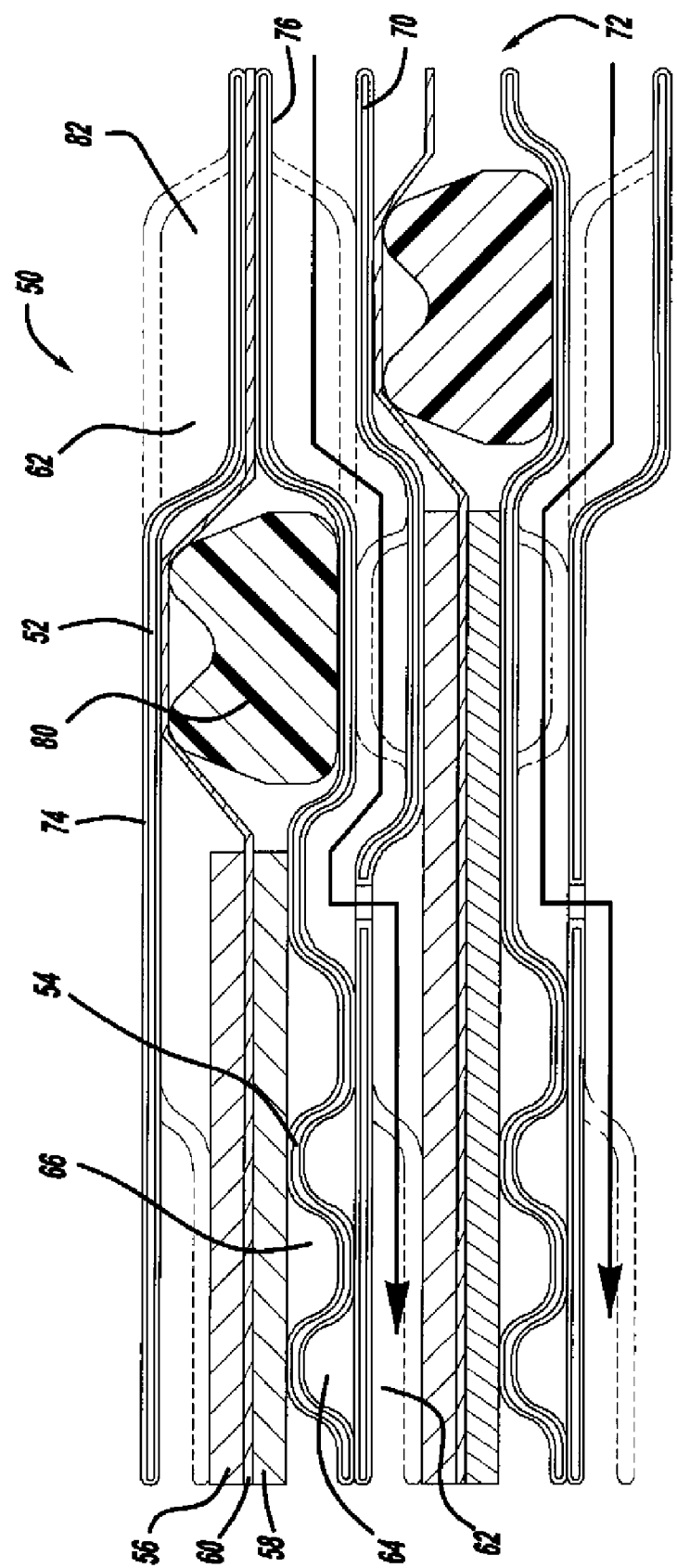
FIG. 4 is a cross-sectional view of a portion of a fuel cell including stamped bipolar plates that show a flow channel tunnel region at a seal area between an anode inlet manifold and a cell active region, where unipolar plates include a hydrophilic layer on each side of the plate, according to an embodiment of the present invention.

FIG. 4 is a cross-sectional view of another portion of the fuel cell 50 between an anode inlet manifold (not shown) and the active area of the fuel cell 50. A seal 80 provides the sealing between the anode inlet manifold and the active region. As is apparent, the anode flow channels 62 also jog around the seal 80, and through a tunnel region 82. As is also apparent, the hydrophilic layer 74 is provided through the tunnel region 82. As would be appreciated by those skilled in the art, the tunnel region between the anode outlet manifold (not shown) and the active region and the cathode outlet manifold (not shown) and the active region would also be coated with the hydrophilic material.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell comprising a first flow field plate and a second flow field plate where the first plate includes reactant gas flow channels and the second plate includes reactant gas flow channels, said first and second flow field plates including a hydrophilic layer that covers both sides of the first and second flow field plates, and extends through a tunnel region between an active area of the fuel cell and a manifold of the fuel cell.

2. The fuel cell according to claim 1 wherein the first and second plates are stamped plates.

3. The fuel cell according to claim 1 wherein the first and second plates are composite plates.

4. The fuel cell according to claim 1 wherein the plate material is stainless steel.

5. The fuel cell according to claim 1 wherein the first and second plates are an anode side unipolar plate and a cathode side unipolar, wherein the anode side unipolar plate combines with a cathode side unipolar plate of an adjacent fuel cell to form a complete bipolar plate and the cathode side unipolar plate combines with an anode side unipolar plate of an adjacent fuel cell to form a complete bipolar plate.

6. The fuel cell according to claim 1 wherein the hydrophilic layer is a metal oxide.

7. The fuel cell according to claim 6 wherein the metal oxide is selected from the group consisting of silicon dioxide ($SiO_2$), hafnium dioxide ($HfO_2$), zirconium dioxide ($ZrO_2$), aluminum oxide ($Al_2O_3$), tin oxide ($SnO_2$), tantalum pent-oxide ($Ta_2O_5$), niobium pent-oxide ($Nb_2O_5$), molybdenum dioxide ($MoO_2$), iridium dioxide ($IrI_2$), ruthenium dioxide ($RuO_2$) and mixtures thereof.

8. The fuel cell according to claim 6 wherein the metal oxide is doped to make it electrically conductive.

9. The fuel cell according to claim 8 wherein the dopant metal oxide is selected from the group consisting of niobium (Nb) and tantalum (Ta) doped titanium oxide ($TiO_2$) and fluorine (F) doped tin oxide ($SnO_2$).

10. The fuel cell according to claim 1 wherein the hydrophilic layer is formed by a chromic acid etch that roughens the surface of the plates to increase their hydrophilicity.

11. A fuel cell comprising:
   an anode side flow field unipolar plate including a plurality of reactant gas flow channels responsive to a reactant gas, said anode side unipolar plate including a hydrophilic layer that covers both sides of the anode side unipolar plate, and extends through a tunnel region between an active area of the fuel cell and an anode manifold of the fuel cell; and
   a cathode side flow field unipolar plate including a plurality of reactant gas flow channels responsive to a reactant gas, said cathode side unipolar plate including a hydrophilic layer that covers both sides of the cathode side unipolar plate, and extends through a tunnel region between the active area of the fuel cell and a cathode manifold of the fuel cell.

12. The fuel cell according to claim 11 wherein the anode side and cathode side unipolar plates are stamped plates.

13. The fuel cell according to claim 11 wherein the anode side and cathode side unipolar plates are composite plates.

14. The fuel cell according to claim 11 wherein the anode side and cathode side unipolar plates are stainless steel.

15. The fuel cell according to claim 11 wherein the hydrophilic layers are a metal oxide.

16. The fuel cell according to claim 11 wherein the hydrophilic layers are formed by a chromic acid etch that roughens the surface of the plates to increase their hydrophilicity.

17. A method for making a flow field plate for a fuel cell, said method comprising:
   providing a first unipolar plate structure including a plurality of reactant gas flow channels;
   depositing a hydrophilic coating on the first unipolar plate structure;
   providing a second unipolar plate structure including a plurality of reactant gas flow channels;
   depositing a hydrophilic coating on the second unipolar plate structure; and
   assembling the first and second unipolar plates to form the complete flow field plate, where the hydrophilic coatings extend through a tunnel region of the flow field plate.

18. The method according to claim 17 wherein providing the first and second unipolar plates includes providing composite first and second unipolar plates.

19. The method according to claim 17 wherein providing the first and second unipolar plates includes providing stamped first and second unipolar plates.

20. The method according to claim 19 wherein providing stamped first and second unipolar plates includes providing stainless steel first and second unipolar plates.

21. The method according to claim 17 wherein depositing a hydrophilic coating on the first and second unipolar plates includes depositing a metal oxide on the first and second unipolar plates.

22. The method according to claim 17 wherein depositing a hydrophilic coating on the first and second unipolar plates includes using a chromatic etch to roughen the surfaces of the first and second unipolar plates.

* * * * *